United States Patent
Park et al.

(10) Patent No.: US 7,012,565 B2
(45) Date of Patent: Mar. 14, 2006

(54) METHOD OF RECEIVING GPS SIGNAL IN A MOBILE TERMINAL

(75) Inventors: Hyung-Weon Park, Suwon-si (KR); Seung-Hwan Kim, Suwon-si (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/912,670

(22) Filed: Aug. 5, 2004

(65) Prior Publication Data

US 2005/0078031 A1 Apr. 14, 2005

(30) Foreign Application Priority Data

Oct. 10, 2003 (KR) ............... 10-2003-0070668

(51) Int. Cl.
*G01S 5/14* (2006.01)

(52) U.S. Cl. ............................... 342/357.12

(58) Field of Classification Search ........... 342/357.12; 455/456.2
See application file for complete search history.

(56) References Cited

U.S. PATENT DOCUMENTS 6,680,695 B1 * 1/2004 Turetzky et al. ........ 342/357.12

* cited by examiner

*Primary Examiner*—Thomas H. Tarcza
*Assistant Examiner*—Fred H. Mull
(74) *Attorney, Agent, or Firm*—Dilworth & Barrese LLP (57) ABSTRACT

A GPS signal receiving method in a mobile terminal having a first reception path and a second reception path is provided. Upon request for GPS signal reception while receiving a CDMA signal in the first reception path, the received strength of a GPS signal is measured. If the GPS signal strength is equal to or greater than a predetermined threshold, the GPS signal is received in the first reception path. If the GPS signal strength is less than the predetermined threshold, the GPS signal is received in the second reception path.

9 Claims, 7 Drawing Sheets

FIG.3C

METHOD OF RECEIVING GPS SIGNAL IN A MOBILE TERMINAL

PRIORITY

This application claims priority under 35 U.S.C. § 119 to an application entitled "Method of Receiving GPS Signal in a Mobile Terminal" filed in the Korean Intellectual Property Office on Oct. 10, 2003 and assigned Serial No. 2003-70668, the contents of which are incorporated herein by reference.

BACKGROUND OF THE INVENTION

1. Field of the Invention

The present invention relates generally to a mobile terminal that receives GPS (Global Positioning System) signals, and in particular, to a method of receiving GPS signals in a mobile terminal in a CDMA (Code Division Multiple Access) communication system.

2. Description of the Related Art

As mobile communication technology has evolved from second generation (2G) mobile communication systems to third generation (3G) mobile communication systems, a variety of contents have become available to users over a mobile communication network. For low-rate data transmission, the mobile communication network modulates data in QPSK (Quadrature Phase Shift Keying) and for high-rate data transmission, it modulates data in QAM (Quadrature Amplitude Modulation). This communication scheme is specified in the 1xEV-DO (Evolution-Data Only) and 1xEV-DV (Evolution-Data and Voice) standards. A terminal supporting the communication scheme has two reception paths to support diversity. Also, the use of GPS is becoming widespread to determine the locations of terminals.

Figure 1A:
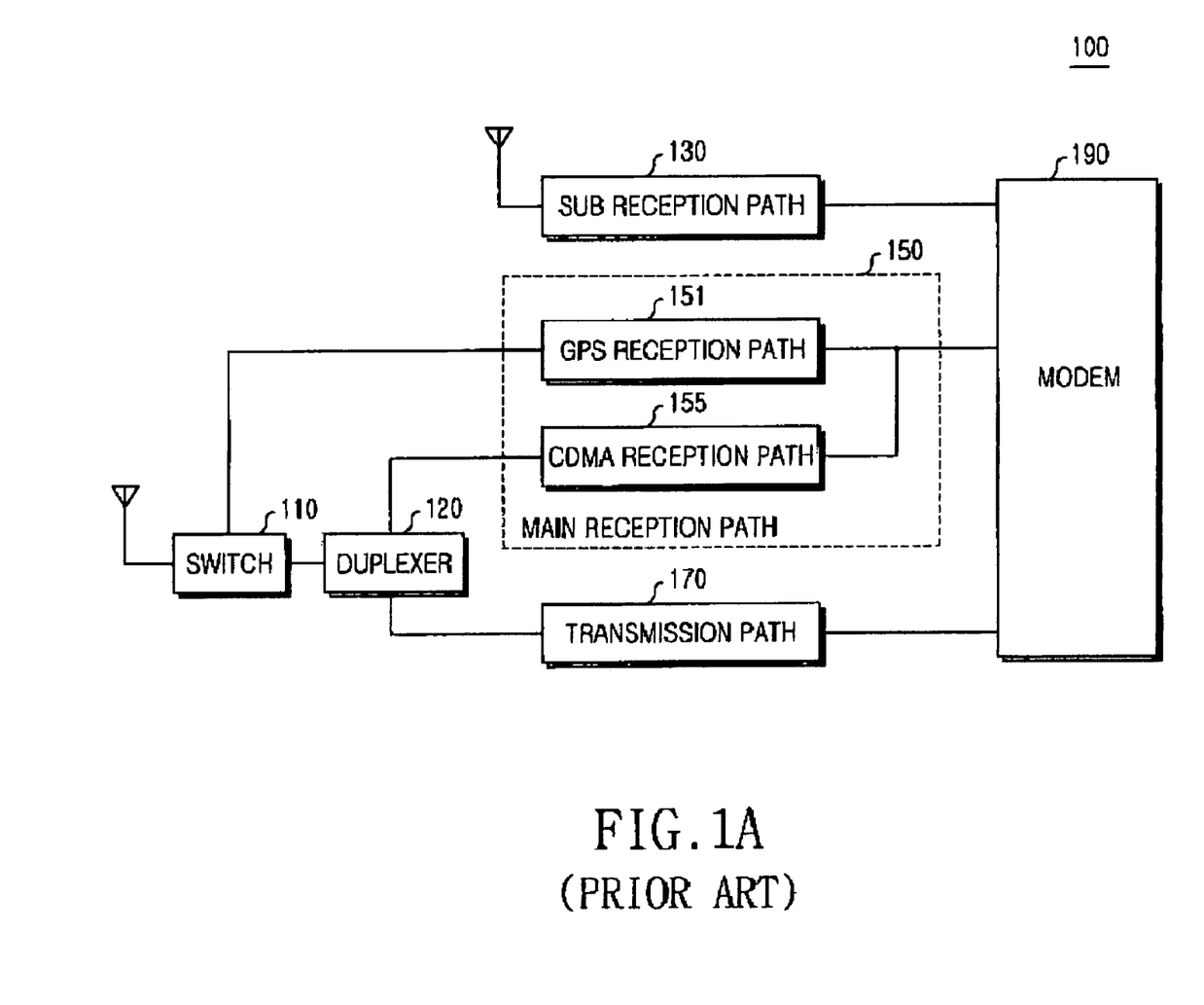
FIGS. 1A and 1B are schematic block diagrams of a transmitter/receiver in a mobile terminal for receiving GPS signals in a conventional method.
Figure 1B:
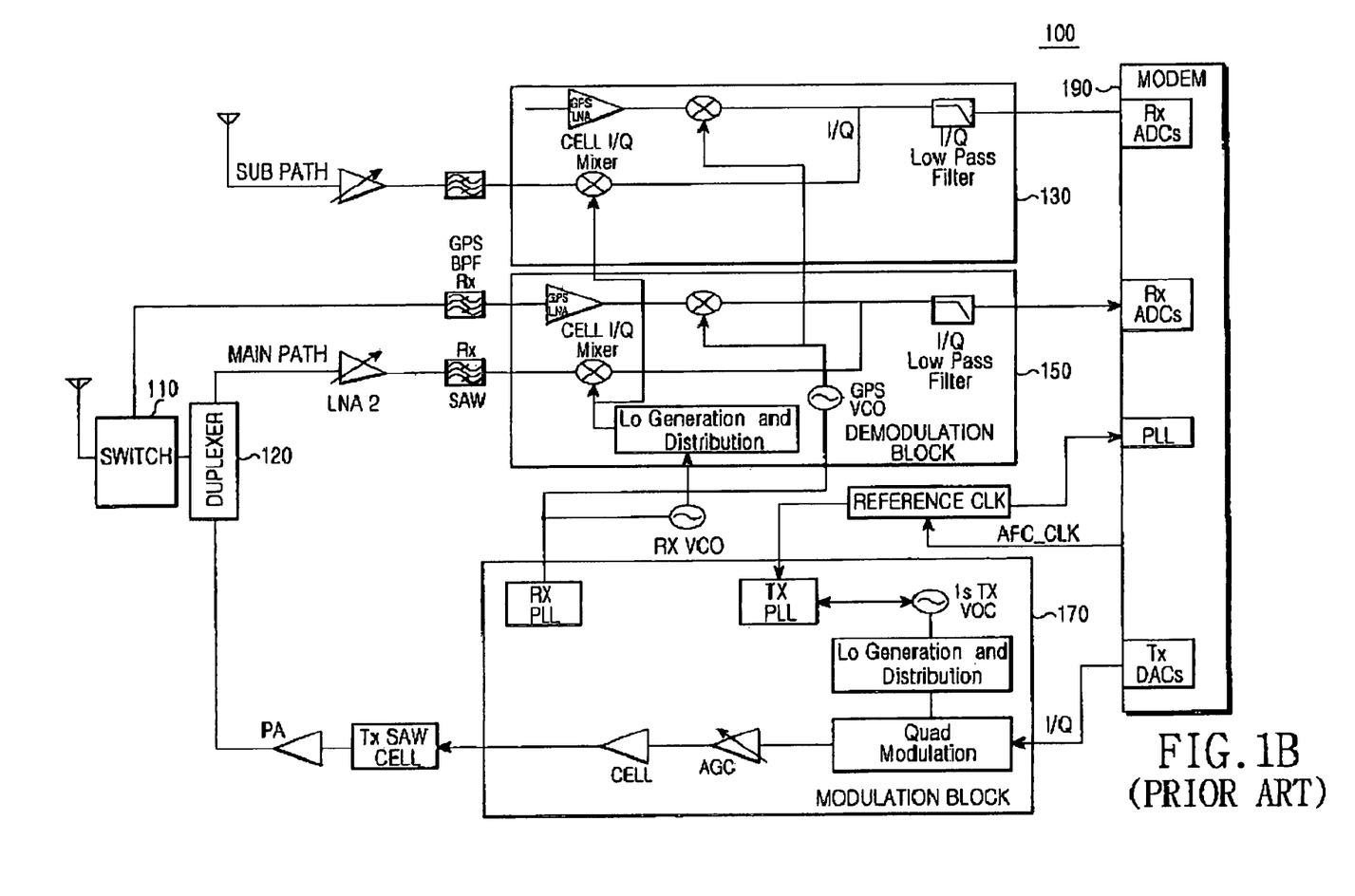

FIGS. 1A and 1B are schematic block diagrams of a transmitter/receiver in a mobile terminal, for receiving GPS signals by a conventional method.

Referring to FIGS. 1A and 1B, a transmitter/receiver 100 in the conventional mobile terminal includes a sub reception path 130, a main reception path 150, and a transmission path 170. The main reception path 150 has a GPS reception path 151 and a CDMA reception path 155.

A switch 110 connected to an antenna decides whether to receive a GPS signal or a CDMA signal for a voice call in the mobile terminal. If the switch 110 selects the GPS signal, it switches data received through the antenna to a MODEM 190 through the GPS reception path 151. On the other hand, if the switch 110 selects the CDMA signal, it switches data received through the antenna to the MODEM 190 through the CDMA reception path 155. A duplexer 120 separates transmission and reception frequency bands of the mobile terminal.

The sub reception path 130 receives high-rate data and delivers it to the MODEM 190.

FIG. 1A schematically illustrates the above-described configuration and FIG. 1B is a more detailed block diagram of the transmitter/receiver 100 illustrated in FIG. 1A.

Referring to FIG. 1B, devices commonly used to receive a GPS signal or a CDMA signal, include a low pass filter provided in the main reception path 150. Therefore, it is impossible for the conventional mobile terminal to simultaneously receive the CDMA signal and the GPS signal via the main reception path 150. Traditionally, the main reception path 150 receives the CDMA signal or the GPS signal by time division. In this case, if the mobile terminal operates outdoors, it can capture a plurality of signals from GPS satellites for a time assigned for GPS signal reception due to its high received power. However, indoors the received power of the mobile terminal becomes weak, making it difficult to capture the GPS satellite signals without interrupting on-going CDMA signal reception, that is, without disconnecting a call. Especially, capturing GPS satellite signals concurrently with CDMA signal reception must be successfully completed in less than about 5 seconds, which imposes a great constraint on conventional mobile terminals.

SUMMARY OF THE INVENTION

An object of the present invention is to substantially solve the above problems and/or disadvantages of conventional systems and to provide at least the advantages described below. Accordingly, an object of the present invention is to provide a method of receiving GPS signals with improved performance in a mobile terminal.

Another object of the present invention is to provide a GPS signal receiving method for improving the performance of a mobile terminal by utilizing a sub reception path for receiving high-rate data for GPS signal reception.

The above objects are achieved by providing a GPS signal receiving method in a mobile terminal having a first reception path and a second reception path. Upon request for GPS signal reception while receiving a CDMA signal in the first reception path, the received strength of a GPS signal is measured. If the GPS signal strength is equal to or greater than a predetermined threshold, the GPS signal is received in the first reception path. If the GPS signal strength is less than the predetermined threshold, the GPS signal is received in the second reception path.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described below with reference to the accompanying drawings. In the following description, well-known functions and constructions are not described in detail to avoid obscuring the description of the invention with unnecessary detail.

Figure 2A:
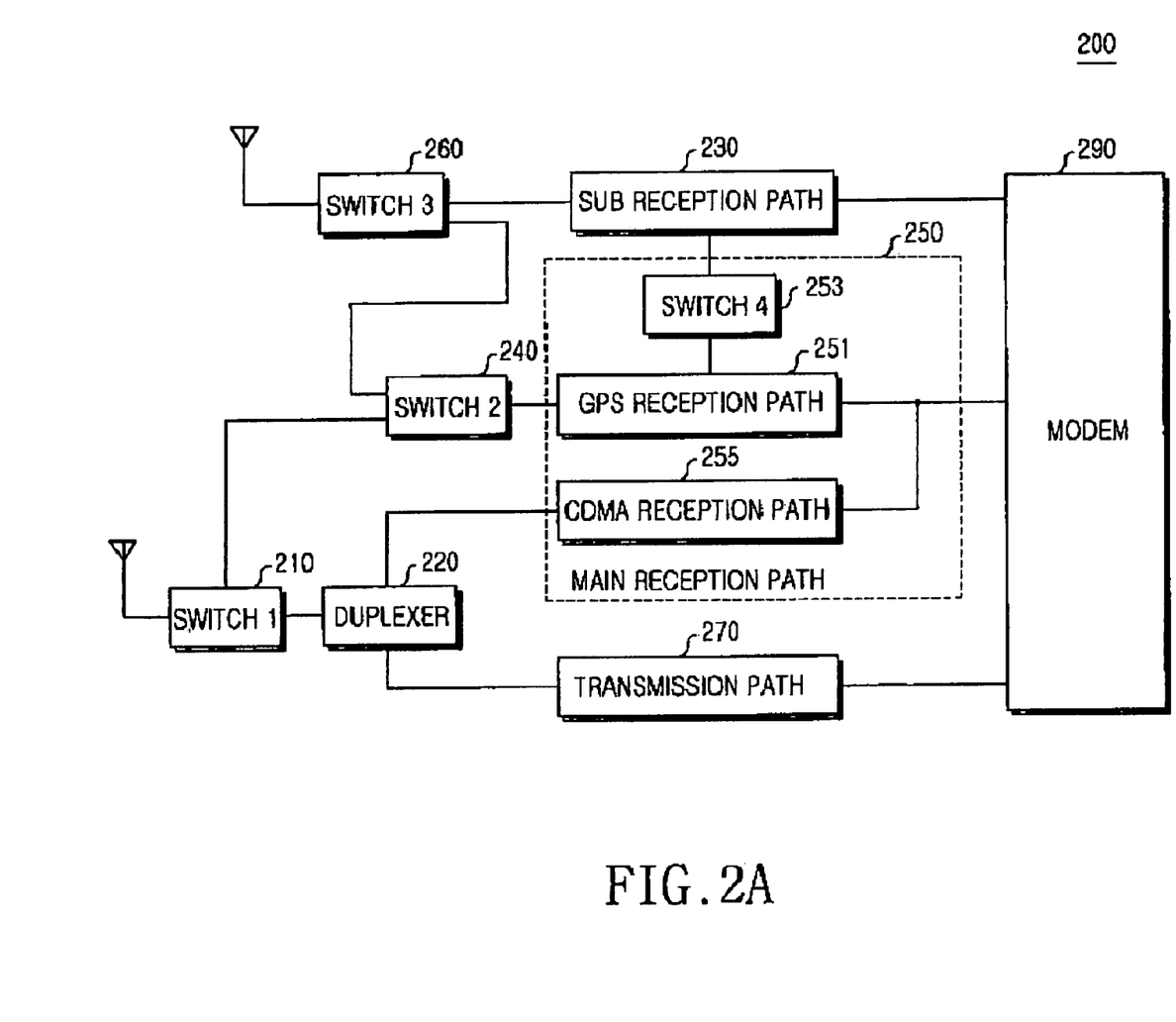
FIGS. 2A and 2B are schematic block diagrams of a transmitter/receiver in a mobile terminal for receiving GPS signals according to an embodiment of the present invention.
Figure 2B:
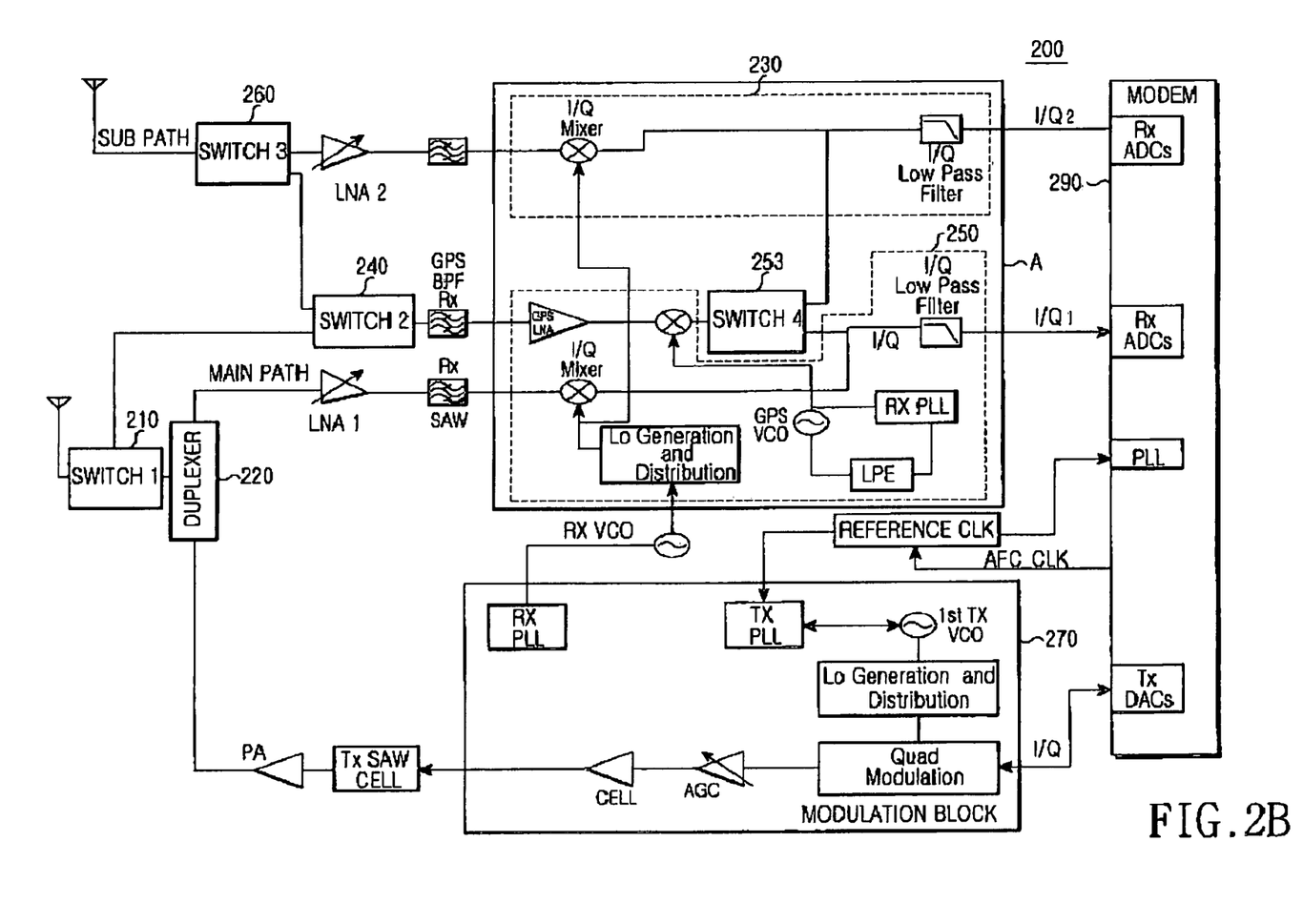

FIGS. 2A and 2B are schematic block diagrams of a transmitter/receiver in a mobile terminal for receiving GPS signals according to an embodiment of the present invention. Particularly, a transmitter/receiver of a mobile terminal (e.g. a 1xEV-DO or 1xEV-DV terminal) with a separately procured path (a sub reception path 230) for high-rate data reception is illustrated by way of example.

Referring to FIGS. 2A and 2B, a transmitter/receiver 200 in the mobile terminal includes the sub reception path 230, a main reception path 250, and a transmission path 270. The sub reception path 230 is for receiving high-rate data. The main reception path 250 has a GPS reception path 251 and a CDMA reception path 255.

The sub reception path 230 is primarily used to receive high-rate data. It is also used to receive a GPS signal when the received strength of a GPS signal is less than a predetermined threshold in the main reception path 250.

A second switch 240 (switch 2) and a third switch 260 (switch 3) are used to select the operations of the sub reception path 230. By selective switching of switch 2 and switch 3, the sub reception path 230 can receive high-rate data or a GPS signal.

A fourth switch 253 (switch 4) is provided in the main reception path 250. If the sub reception path 230 is supposed to receive a GPS signal, the fourth switch 253 connects the sub reception path 230 to the GPS reception path 251, and predetermined devices, such as a low noise amplifier (LNA) and a mixer following the LNA, are switched for GPS signal reception to operate in conjunction with the sub reception path 230.

A first switch 210 (switch 1) decides whether to receive a GPS signal or a CDMA signal for a voice call in the mobile terminal. A duplexer 220 controls transmission/reception from/to the mobile terminal. When a transmission signal modulated in a MODEM 290 is delivered in the transmission path 270, the duplexer 220 separates the transmission signal and transmits it to switch 1. If a CDMA or GPS signal is received through the antenna, the duplexer 220 separates the received signal and transmits the received signal to the main reception path 250.

FIG. 2A schematically illustrates the above-described configuration and FIG. 2B provides a more detailed block diagram of the transmitter/receiver 200 illustrated in FIG. 2A. With reference to FIG. 2B, the operation of the mobile terminal according to the embodiment of the present invention will be described in more detail.

Referring to FIG. 2B, the received signal from the duplexer 220 passes through a first low noise amplifier (LNA 1) and a surface acoustic wave (SAW) filter for eliminating an image frequency. The signal output from the SAW filter is applied to the main reception path (QPSK demodulation block) 250. In the main reception path 250, the signal is divided into I and Q channel signals, modulated by a local frequency generated from a voltage controlled oscillator (VCO), and then provided to an analog to digital converter (ADC) in the MODEM 290 through a Low Pass Filter (LPF). In the example provided in FIG. 2B, the main reception path 250 adopts direct conversion.

Meanwhile, the transmission path (modulation block) 270 modulates a signal received from a Digital to Analog Converter (DAC) of the MODEM 290 in QPSK by fixing a local frequency from an internal first transmission VCO ($1^{st}$ Tx VCO) for generation of a transmission frequency signal. After the modulation, the transmission path 270 transmits the modulated signal to the duplexer 220 through an Automatic Gain Control (AGC) amplifier, a filter, and a power amplifier (PA). The transmission signal is then transmitted through the antenna associated with switch 1.

In the GPS reception path, a received GPS signal is transmitted to an ADC of the MODEM 290 through a filter for eliminating an outband signal from the GPS signal, a mixer for demodulation, and an LPF.

In the sub reception path 230, data is received through a sub path antenna, i.e. an antenna different from that for the main reception path 250. The sub reception path 230 is configured similar to the main reception path 250, except for the GPS reception path. Therefore, the sub reception path 230 provides the received data to an ADC of the MODEM 290 through a second LNA (LNA 2), an I/Q mixer, and a low pass filter.

When the mobile terminal having the above configuration is used outdoors, it operates the main reception path 250 to recover low-rate data and to receive GPS signals. When the mobile terminal is to receive high-rate data, it uses both the main reception path 250 and the sub reception path 230. In this case, the power of a GPS signal received is approximately −130 dBm. Due to the high signal strength, a plurality of GPS signals can be captured. If the mobile terminal is operated indoors, the GPS signal received strength drastically drops. As indicated above, when a CDMA call is in progress, the mobile terminal must capture a GPS signal usually in less than 5 seconds. This is readily accomplished by the mobile terminal illustrated in FIGS. 2A and 2B of the present invention. Since a plurality of paths are defined, the CDMA call continues in one path (e.g. the main reception path) while the GPS signal is captured in another path (e.g. the GPS reception path). Hence, the GPS signal is quickly captured during the on-going CDMA call.

Figure 3A:
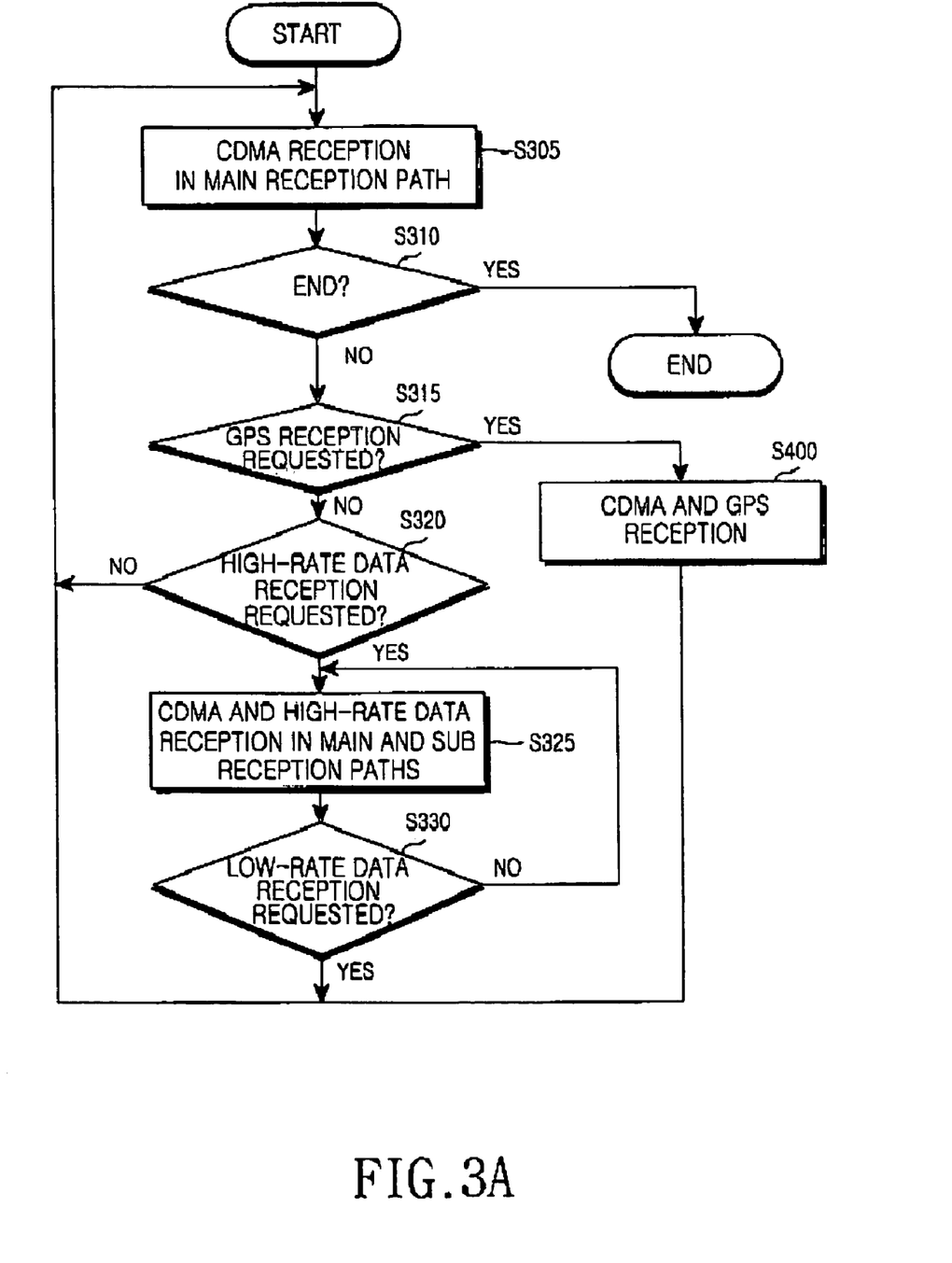
FIGS. 3A, 3B and 3C are flowcharts illustrating a GPS signal receiving operation in the mobile terminal according to the embodiment of the present invention.
Figure 3B:
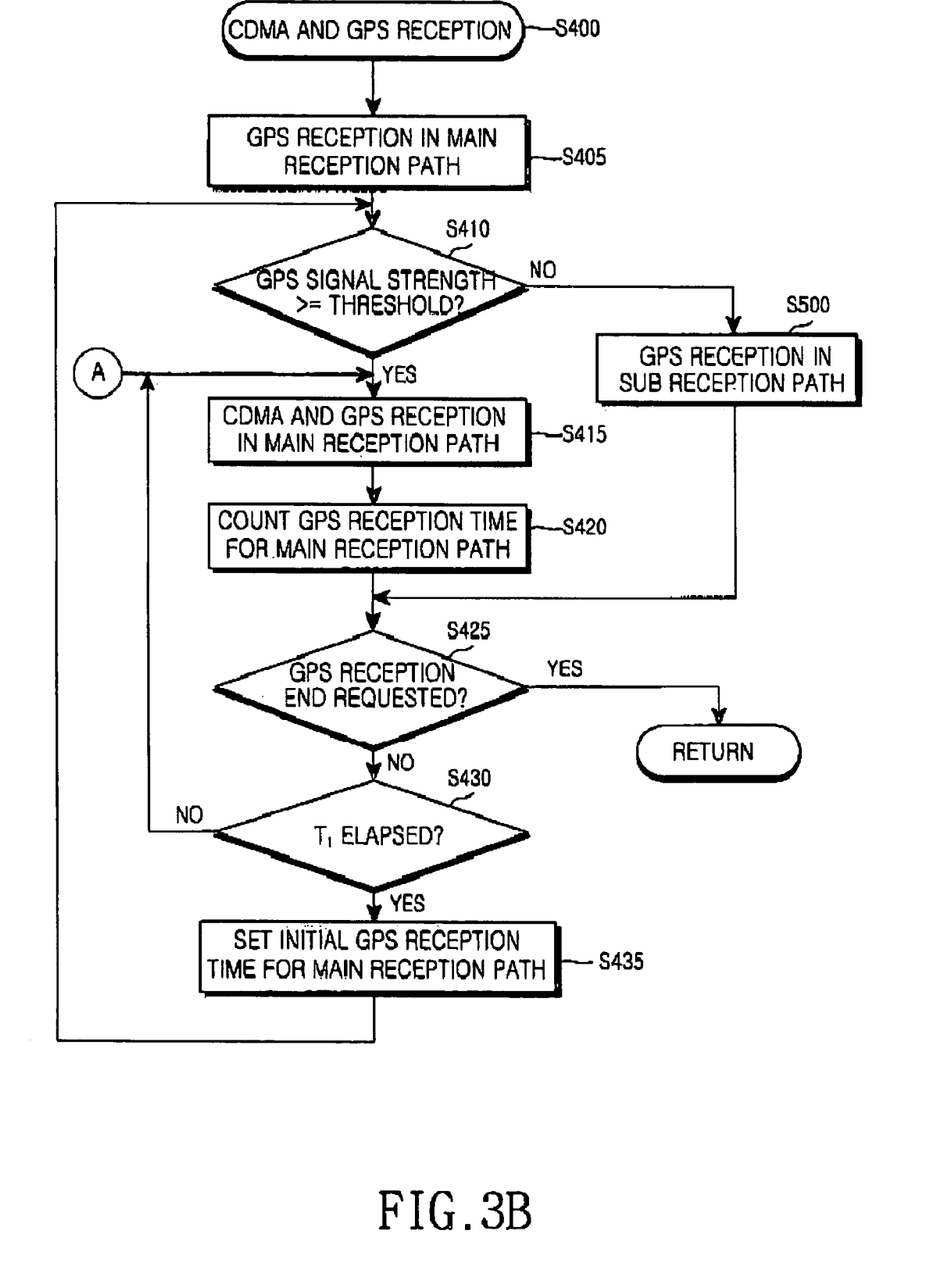
Figure 3C:
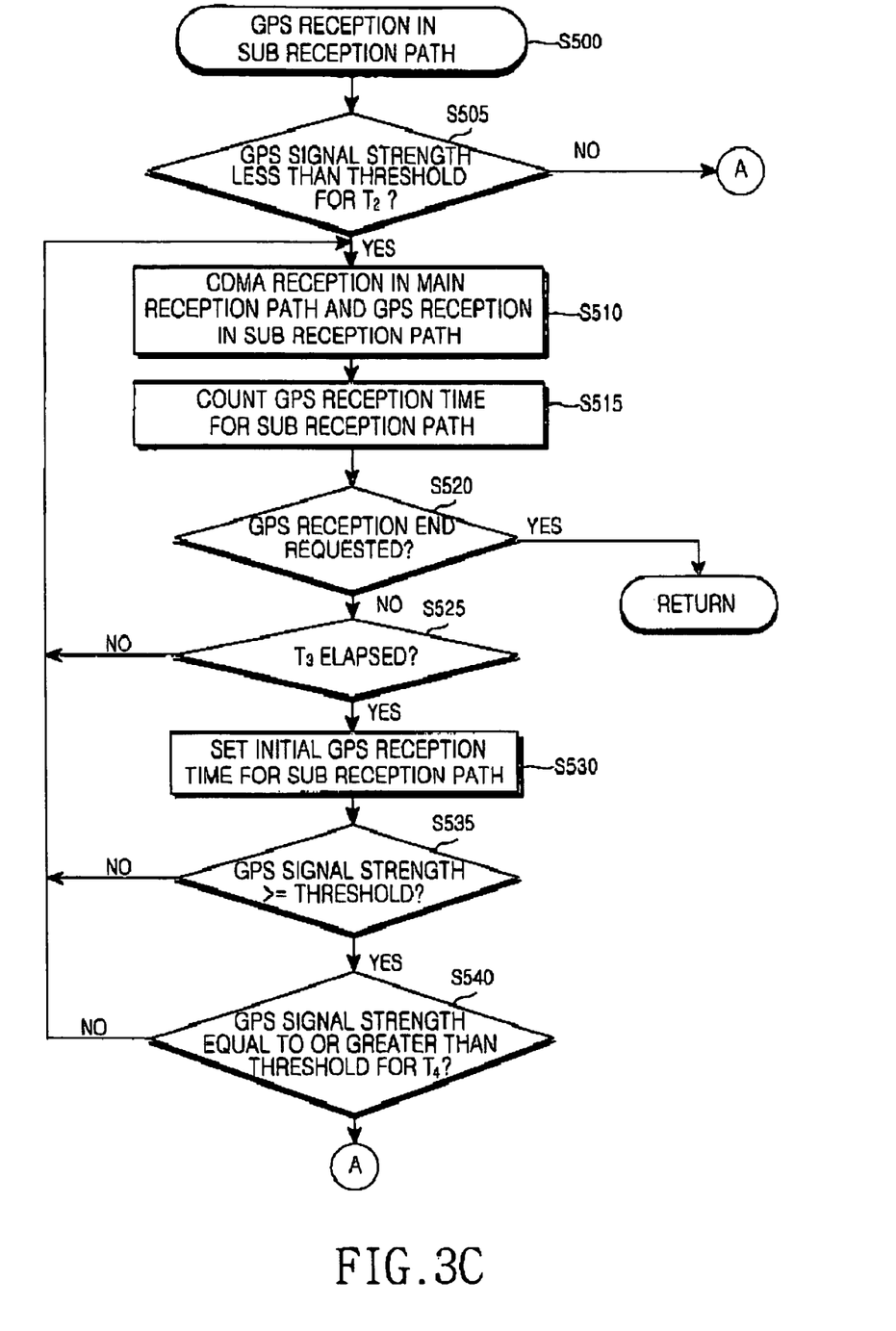

FIGS. 3A, 3B and 3C are flowcharts illustrating a GPS signal receiving operation in the mobile terminal illustrated in FIGS. 2A and 2B according to the embodiment of the present invention.

FIG. 3A is a flowchart illustrating an operation of the mobile terminal mainly in the case where GPS signal reception is not requested.

Referring to FIG. 3A, upon power-on, the mobile terminal initializes its function blocks. For example, the mobile terminal acquires a pilot signal and performs an initialization procedure to communicate with a base station according to a CDMA operation process (not shown).

In step S305, the mobile terminal receives a CDMA signal using the initialized blocks. Specifically, the mobile terminal receives the CDMA signal in the main reception path. During the CDMA signal reception, the sub reception path is in an off state, that is, the sub reception path is blocked.

If in step S310 an end command is not received, the mobile terminal decides whether GPS signal reception has been requested, continuing the CDMA signal reception in the main reception path in step S315. If GPS signal reception has been requested, the mobile terminal receives a GPS signal during the CDMA signal reception in step 400, described below in regard to FIG. 3B.

Alternatively, if GPS signal reception has not been requested in step S315, the mobile terminal decides whether high-rate data reception has been requested, continuing the CDMA signal reception in the main reception path in step S320. If it has, the mobile terminal receives high-rate data during the CDMA signal reception in step 325. That is, when high-rate data reception is requested and GPS signal reception is not requested, the CDMA signal and high-rate data are received in respective main and sub reception paths. Step S325 continues until low-rate data reception is requested. If low-rate data reception is requested during step S325, the mobile terminal blocks the sub reception path and receives CDMA data in the main reception path in step S305.

FIG. 3B is a flowchart illustrating a CDMA and GPS signal receiving operation according to the embodiment of the present invention. If GPS signal reception is requested during the CDMA signal reception in the main reception path in step S315, the mobile terminal performs the procedure illustrated in FIG. 3B, while receiving the CDMA signal.

Referring to FIG. 3B, the mobile terminal receives a GPS signal in the main reception path that is receiving the CDMA signal, in order to measure the strength of the GPS signal in the main reception path, in step S405. The mobile terminal compares the GPS signal strength with a predetermined threshold in step S410. If the GPS signal strength is equal to or greater than the predetermined threshold, the mobile terminal receives both the CDMA signal and the GPS signal in the main reception path in step S415.

The mobile terminal then counts the time for which it receives the GPS signal in the main reception path in step S420. If the GPS signal reception time in the main reception path exceeds a first predetermined time ($T_1$) in step S430, the mobile terminal sets an initial GPS reception time count for the main reception path in step S435 and returns to step S410. This time count allows for varying GPS signal strength caused by external factors, and a reception path of the GPS signal will be changed if the GPS signal strength drops along with the movement of the mobile terminal (e.g. from outdoors to indoors) during the GPS signal reception.

Upon request of terminating GPS signal reception during the CDMA and GPS signals reception in the main reception path in step S425, the mobile terminal returns to step S305.

If the GPS signal strength is less than the predetermined threshold in step S410, the mobile terminal receives the GPS signal in the sub reception path in step S500. Step S500 is detailed in FIG. 3C.

Referring to FIG. 3C, the mobile terminal decides whether the GPS signal strength is less than the predetermined threshold for a second predetermined time ($T_2$) in step S505. That is, at step S505 it is decided whether the state in which the GPS signal strength is less than the predetermined threshold lasts for at least time $T_2$. This step is needed to decide whether the decrease of the GPS signal strength is attributed to the movement of the mobile terminal from outdoors to indoors or if it is only temporary due to another external factor.

If the GPS signal strength is less than the predetermined threshold for time $T_2$, the mobile terminal receives the GPS signal in the sub reception path, receiving the CDMA signal in the main reception path in step S510. That is, the sub reception path is set as the reception path for the GPS signal and the GPS signal is received in the sub reception path.

The mobile terminal counts the time for which it receives the GPS signal in the sub reception path in step S515. If the GPS signal reception time in the sub reception path exceeds a predetermined time ($T_3$) in step S525, the mobile terminal sets an initial GPS reception time count for the sub reception path in step S530 and compares the GPS signal strength with a predetermined threshold in step S535. This is because the GPS signal strength is variable according to external factors and a reception path of the GPS signal will change as the GPS signal strength increases when the mobile terminal moves from indoors to outdoors during the GPS signal reception in the sub reception path.

If the GPS signal strength is equal to or greater than the predetermined threshold in step S535, the mobile terminal decides whether the state in which GPS signal strength is at or above the predetermined threshold lasts for a predetermined time ($T_4$) in step S540. Step S540 is performed to neglect changes in the GPS signal strength attributable to temporary phenomenon due to an external factors other than movement of the mobile terminal.

If the GPS signal strength is equal to or greater than the predetermined threshold for time $T_4$, the mobile terminal changes the GPS reception path from the sub reception path to the main reception path, considering that the mobile terminal has moved from outdoors to indoors in step S540. That is, the mobile terminal returns to step S415 of FIG. 3B to receive the CDMA and GPS signals in the main reception path.

Meanwhile, upon request for termination of the GPS signal reception during the GPS signal reception in the sub reception path in step S520, the mobile terminal returns to step S305 of FIG. 3A to receive only the CDMA signal in the main reception path.

As described above, the present invention advantageously improves GPS signal reception performance in a mobile terminal by receiving a CDMA signal and a GPS signal via a plurality of reception paths. Also, a reception path is selected for the GPS signal by comparing the received strength of the GPS signal with a predetermined threshold, thereby improving the performance of the mobile terminal.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A GPS (Global Positioning System) signal receiving method in a mobile terminal having a first reception path and a second reception path, comprising:
    (1) measuring, upon request for GPS signal reception while receiving a CDMA (Code Division Multiple Access) signal in the first reception path, the received strength of a GPS signal;
    (2) receiving the GPS signal in the first reception path, if the GPS signal strength is equal to or greater than a predetermined threshold; and
    (3) receiving the GPS signal in the second reception path, if the GPS signal strength is less than the predetermined threshold.

2. The GPS signal receiving method of claim 1, wherein the first reception path is set to receive low-rate data.

3. The GPS signal receiving method of claim 1, wherein the second reception path is set to receive high-rate data.

4. The GPS signal receiving method of claim 1, wherein step (2) further comprises:
    counting a time for which the GPS signal is received in the first reception path;
    determining whether the counted GPS reception time in the first reception path exceeds a first predetermined time $T_1$; and
    comparing the GPS signal strength with the predetermined threshold if the GPS reception time in the first reception path exceeds the first predetermined time $T_1$.

5. The GPS signal receiving method of claim 4, wherein step (2) further comprises changing the reception path of the GPS signal to the second reception path if the GPS signal strength is less than the predetermined threshold.

6. The GPS signal receiving method of claim 1, wherein step (3) further comprises determining whether a state where the GPS signal strength is less than the predetermined threshold lasts for a second predetermined time $T_2$.

7. The GPS signal receiving method of claim 1, wherein step (3) further comprises:
    counting a time for which the GPS signal is received in the second reception path;
    determining whether the counted GPS reception time in the second reception path exceeds a third predetermined time $T_3$; and
    comparing the GPS signal strength with the predetermined threshold if the GPS reception time in the second reception path exceeds the third predetermined time $T_3$.

8. The GPS signal receiving method of claim 7, wherein step (3) further comprises changing the reception path of the GPS signal to the first reception path if the GPS signal strength is equal to or greater than the predetermined threshold.

9. The GPS signal receiving method of claim 8, wherein step (3) further comprises determining whether the state where the GPS signal strength is equal to or greater than the predetermined threshold lasts for a fourth predetermined time $T_4$.

* * * * *